(12) United States Patent
Kuhlmann et al.

(10) Patent No.: US 7,550,089 B2
(45) Date of Patent: Jun. 23, 2009

(54) FLOATING ULTRAVIOLET WATER PURIFICATION DEVICE

(75) Inventors: Kurt Kuhlmann, San Jose, CA (US); Dan R. Matthews, Gilbert, AZ (US)

(73) Assignee: Meridian Design, Inc., Cardiff, CA (US)

( * ) Notice: Subject to any disclaimer, the term of this patent is extended or adjusted under 35 U.S.C. 154(b) by 17 days.

(21) Appl. No.: 11/463,852

(22) Filed: Aug. 10, 2006

(65) Prior Publication Data

US 2008/0035581 A1 Feb. 14, 2008

(51) Int. Cl.
*B01J 19/08* (2006.01)
*C02F 1/32* (2006.01)
(52) U.S. Cl. ............... 210/748; 205/701; 250/436; 422/186.3
(58) Field of Classification Search ............. 210/748; 205/701; 250/436; 422/186.3
See application file for complete search history.

(56) References Cited

U.S. PATENT DOCUMENTS

| 6,403,030 | B1 * | 6/2002 | Horton, III .................... 422/24 |
| 6,589,490 | B1 * | 7/2003 | Parra ......................... 422/186.3 |
| 2004/0061069 | A1 * | 4/2004 | Schalble et al. ......... 250/432 R |
| 2005/0156119 | A1 * | 7/2005 | Greene ....................... 250/436 |

FOREIGN PATENT DOCUMENTS

DE 19911443 A1 * 9/2000
JP 2001347265 A * 12/2001

* cited by examiner

*Primary Examiner*—Walter D Griffin
*Assistant Examiner*—Cameron J Allen
(74) *Attorney, Agent, or Firm*—Zarian Midgley & Johnson PLLC

(57) ABSTRACT

A method and apparatus for disinfecting water using ultraviolet light. An apparatus with an ultraviolet light source is floated in a water container such that the ultraviolet light source is suspended beneath the water surface and is capable of emitting ultraviolet light into the surrounding water.

20 Claims, 6 Drawing Sheets ural areas of the United States with poor
FLOATING ULTRAVIOLET WATER PURIFICATION DEVICE

TECHNICAL FIELD

This disclosure relates generally to devices and methods for disinfecting water and, more particularly, to a portable, low-cost system for disinfecting water using ultraviolet light.

BACKGROUND OF THE INVENTION

Every day, thousands die worldwide due to infections from waterborne bacteria and viruses. Death typically results from acute dehydration, malnutrition, or other related complications. The majority of victims are young children or elderly people that live in economically impoverished countries. In these regions, contaminated surface water sources and poorly functioning municipal water distribution systems lead to the transmission of waterborne bacterial and viral diseases. Although the problem is particularly bad in impoverished countries, population groups in developed countries, such as residents in remote rural areas of the United States with poor water treatment and delivery systems, are also at risk. In addition, campers and hikers who do not have access to treated water also commonly fall victim to waterborne bacterial and viral infections.

Conventional centralized water treatment and distribution systems can be very expensive and take years to construct. Furthermore, it is often impractical to provide centralized water treatment in sparsely populated areas. Therefore, providing at-risk groups with potable water requires innovative practical solutions such as, for example, point-of-use disinfection. In one disinfection method, ultraviolet ("UV") radiation having wavelengths in the range of 200 to 300 nm are used to kill disease-carrying microorganisms in water. UV radiation has been found to deactivate a broad spectrum of pathogenic contaminates from amoebic-sized microorganisms to bacteria, algae and viruses. Water purification by ultraviolet radiation provides numerous advantages over other currently available water treatment methods. For example, UV water purification systems do not require chemicals nor do they require expensive filters.

Existing UV water purification systems are often large installed flow-through systems serving a large number of people. However, in recent years, a number of smaller portable UV water purification systems have become available for use by individuals. Portable UV water purification systems use fluorescent tubes for emitting UV light into the water. A quartz cover is often provided around the fluorescent tube to protect the light source from mechanical shock and to electrically insulate the light source from the water being disinfected. Quartz covers are commonly used because it has been found that quartz is transparent at germicidal UV wavelengths, such as, around 254 nm.

Existing portable UV water purification systems also include electronic circuitry for driving the fluorescent lamp. These devices and their circuits are often heavy and include multiple batteries in order to power the device and as such will sink if released into the liquid being treated. Furthermore, they must be affixed to the containers of liquid they are treating or otherwise held in place therein. As a result many containers are not viable candidates for treatment with such a device. Finally, point-of-use devices are generally small and cannot reach into the depths of a large container, limiting their usefulness to small storage and drinking containers.

Due to the costs associated with existing UV water purification systems, a need exists for an improved water purification system that requires fewer components and is easily affordable to large segments of the population. It is desirable that such a system be rugged in construction and easily transportable for disinfecting drinking water in regions where water purification is not readily available. It is also desirable that such a device be lightweight, compact, and easy to use. The present invention addresses these needs.

SUMMARY OF THE INVENTION

The disclosed methods and devices provide improved portable UV water purification. A preferred embodiment is small and light enough to be easily transported and floated in nearly any container of liquid. Other embodiments may include other features and advantages, such as one or more switches to control starting or stopping the treatment cycle, an internal power source, indicators of system status and operation, and a small, easily grasped handle on top of the device to facilitate removal of device from liquid. Another embodiment may also be able to detect whether it is immersed in a liquid, measure how long it has been active or inactive, and control the operation of the UV light source based on these parameters. Means for recharging an internal battery power source may also be provided.

BRIEF DESCRIPTION OF THE DRAWINGS

The features and advantages of the present invention will be discussed in detail in the following description, and in conjunction with the accompanying drawings.

DETAILED DESCRIPTION OF THE INVENTION

Preferred embodiments of the present invention described herein provide an improved floating portable water purification device which uses UV light for killing disease-carrying microorganisms in water. The water purification device may be used to remove contaminants from dangerous water supplies in locations wherein water purification is not readily available. In one application, the water purification system may be used by residents living in remote or impoverished regions to treat contaminated water. In another application, campers or hikers may use the water purification device to disinfect water from lakes or streams before drinking. Furthermore, the water purification device may be used to disinfect water around the house during emergencies, such as an earthquake or flood, wherein the tap water has become contaminated.

Figure 1:
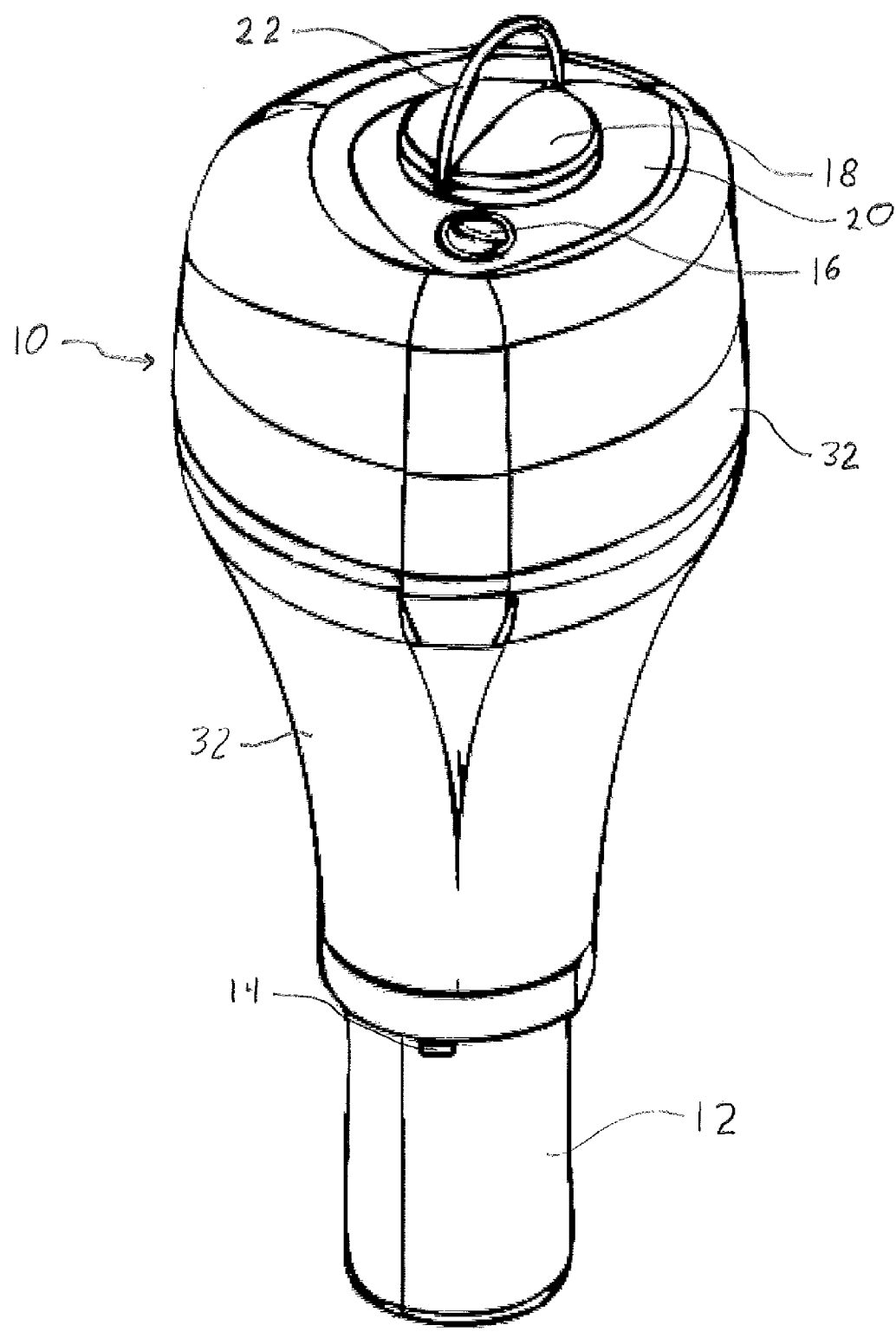
FIG. 1 is a perspective view of an embodiment of the water purification device.

With reference now to the FIG. 1, for purposes of illustration, one preferred embodiment of a water purification device includes, generally, UV light source 12, control circuit 28, power supply 26, enclosed within bulbous case 32 capable of floating in the liquid it is treating. In one preferred embodiment, the water purification system is constructed such that the UV light source does not require a quartz cover, thereby substantially reducing the cost of manufacture.

With continued reference to the FIG. 1, for purposes of illustration, one preferred embodiment of a water purification device includes a compartment shape which makes the device easy to grasp, and a handle 22.

With continued reference to the FIG. 1, for purposes of illustration, one preferred embodiment of a water purification device includes a sensor 14 for detecting the presence or absence of liquid. The device may be designed such that it will not start if not immersed in the liquid to be treated, or can shut off automatically if removed from the liquid. Methods and circuits for performing this function are well known and are exemplified by the teachings of U.S. Patent Application 2005/0205480 filed on Dec. 3, 2004 by Kuhlmann et al., which is incorporated in its entirety herein by reference.

With continued reference to the FIG. 1, for purposes of illustration, one preferred embodiment of a water purification device includes one or more buttons 16. The button(s) 16 can be configured to turn the UV lamp, tube, or other source 12 on and or off directly and or configured as input to a circuit such as a micro-controller that controls the lamp output.

With continued reference to the FIG. 1, for purposes of illustration, one preferred embodiment of a water purification device includes one or more light-emitting diodes ("LED") 20 or other visible lamps. LED 20 may be colored for simple low level illumination or indication or it can be bright white type and be used for illumination secondary to the primary function of liquid treatment. LED 20 can also be used to indicate the various functions and conditions of the device including but not limited to start indication, normal cycle completion, aborted cycle completion, and low battery as well as other status conditions. More than one LED 20 can be used in combinations of colors and white to allow various combinations of indicators and illumination.

With continued reference to the FIG. 1, for purposes of illustration, one preferred embodiment of a water purification device includes a compartment cover 18 that allows access to internal components including the battery 26, circuit board, UV lamp 12 if not serviced from outside the compartment, and other internal components.

Figure 2:
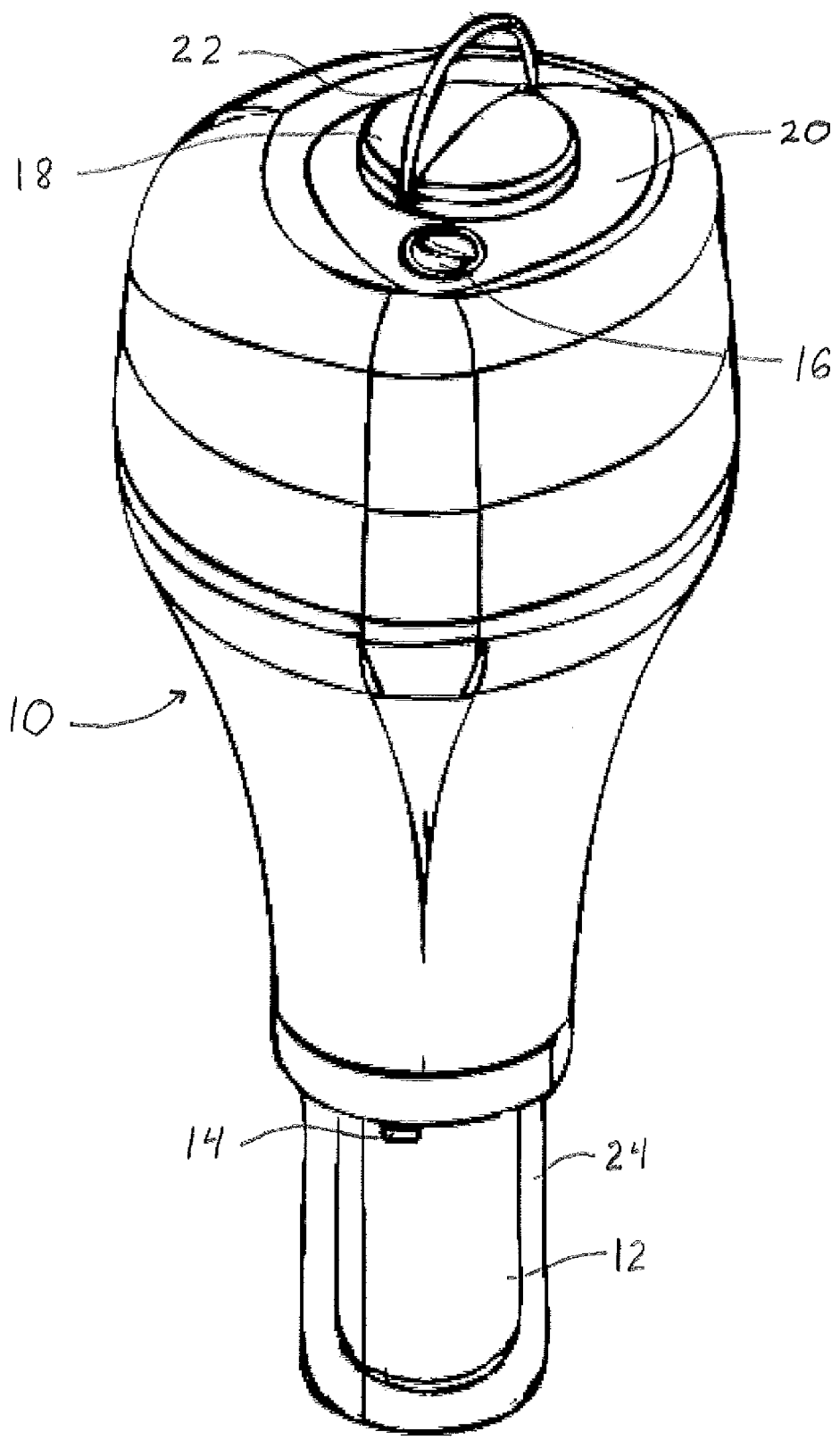
FIG. 2 is a perspective view of an embodiment of the water purification device.

With reference now to the FIG. 2, for purposes of illustration, one embodiment includes UV transparent cover 24. One preferred embodiment of a water purification device includes a cover 24 to protect the UV lamp 12 and that can also be sealed to the case 32 to assist in protecting the internal components from leakage of the liquid into the compartment. In all other respects all of the heretofore discussed combinations are possible with the addition of UV transparent cover 24 including liquid sensor 14, LEDs 20, timer, handle 22, etc.

Figure 3:
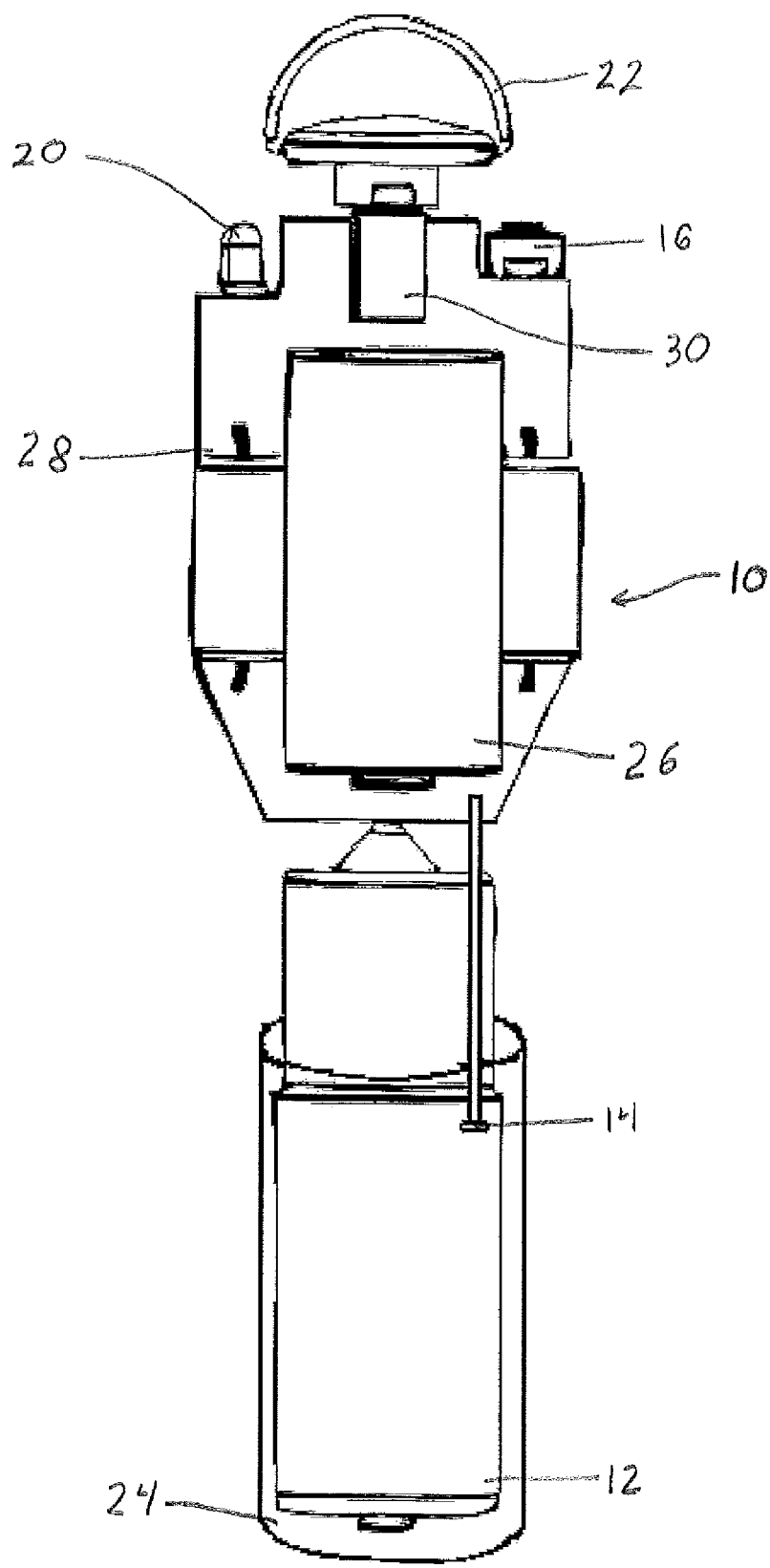
FIG. 3 is an inside view of an embodiment of the water purification device.

With reference now to the FIG. 3, for purposes of illustration, a number of internal features are shown. One preferred embodiment includes an auxiliary power jack 30 that allows the device to be powered from an external source or disconnected and run from an internal battery 26. Although preferred embodiments are described herein as using batteries to provide a power supply, a variety of alternative power sources may be used. For example, a human powered generator may be incorporated into the device or may be provided as an option that may be attachable to the device. In another alternative embodiment, a solar powered generator (e.g., photovoltaic cells) may be used to provide a power source. These alternative power sources may be used alone or in combination with batteries. The human powered generator and the solar powered generator each has the advantage of providing a renewable power source that can be used anywhere. Other power sources capable of providing the necessary electrical current and voltage will be apparent to those of skill and are intended to be within the scope of the claims.

With further reference to the FIG. 3, an internal power source can include a battery 26. The battery may be rechargeable and the control circuit 28 can be configured to manage charging of said battery.

An external power source can be connected by way of leads with magnets fixed to their ends. The external power source so connected can be used to operate the device or to recharge an internal rechargeable battery 10 or power the device separately.

Figure 4:
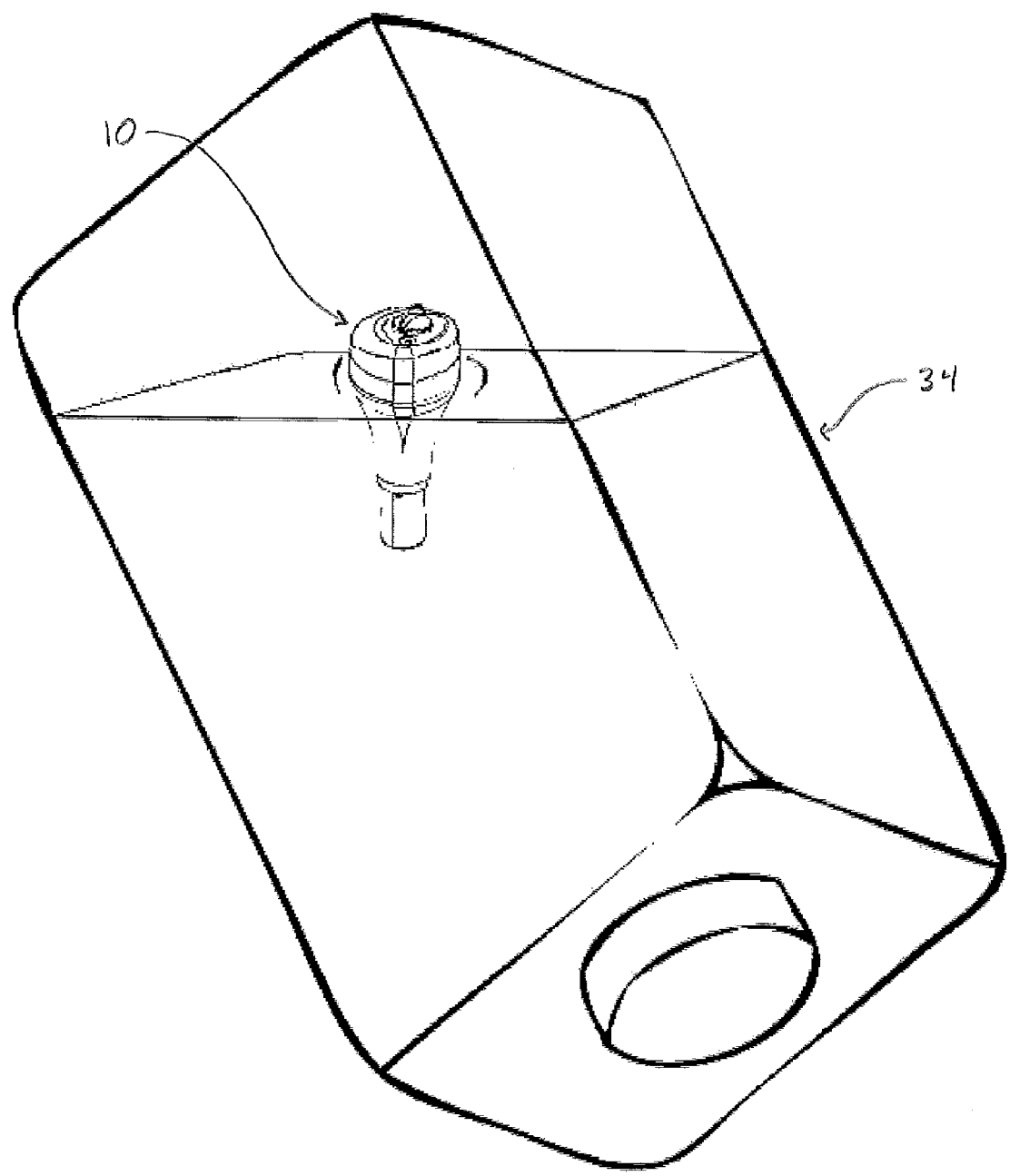
FIG. 4 is a perspective view of an embodiment of the water purification device.
Figure 5:
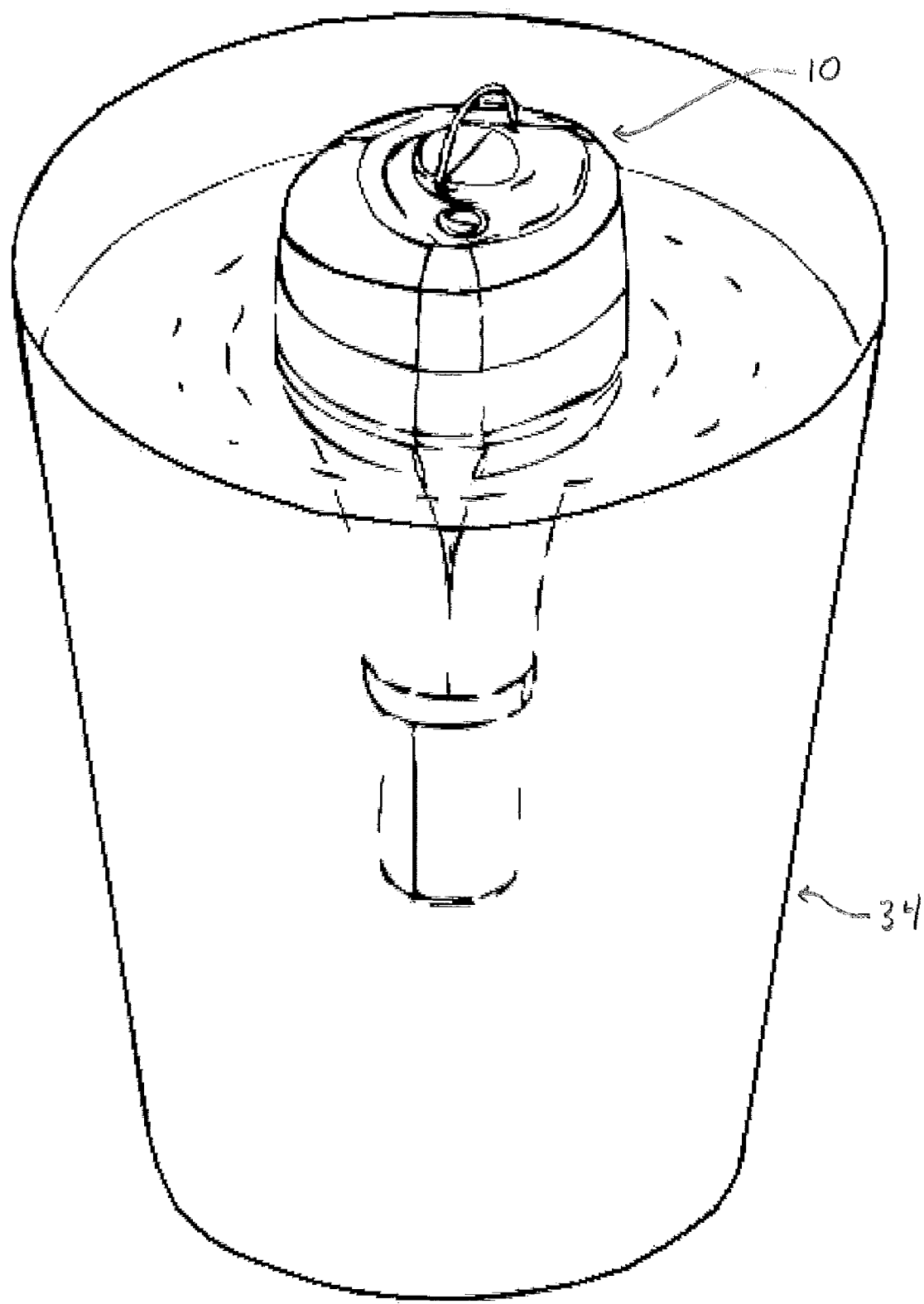
FIG. 5 is a perspective view of another embodiment of the water purification device.
Figure 6:
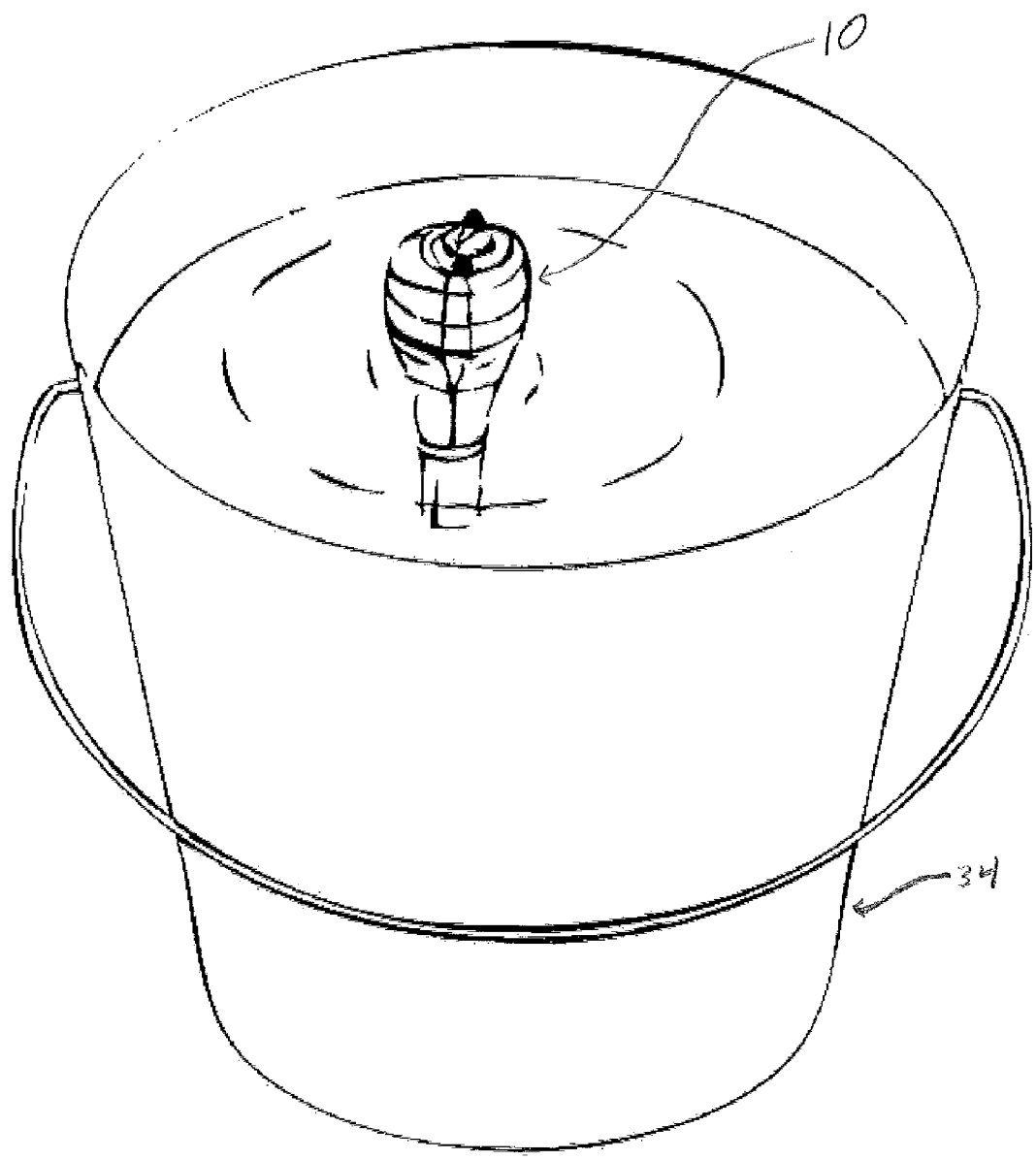
FIG. 6 is a perspective view of another embodiment of the water purification device.

With reference now to the FIGS. 4, 5, and 6, for purposes of illustration, the operation of the device will now be described during use for disinfecting water. Before use, the circuit is initially in "off" condition such that the circuit to the UV lamp 12 is open and no current flows. After a container 34, such as but not limited to those shown in FIGS. 4, 5, and 6, is filled with water or another liquid, the user actuates the button or switch 16 to begin a sterilization cycle. In one preferred embodiment, button 16 is disposed at the top end of the device 10. A single pole push button switch may preferably be used for reducing system cost.

After the switch 16 is depressed, one preferred embodiment uses a micro-controller in the control circuit 28 which wakes from a low power mode and begins operating. During use, if the user desires to terminate the cycle for any reason, the button 16 may be pressed again during operation of the UV lamp 12. This will cause the sterilization cycle to terminate.

In one variation, the micro-controller is preferably configured to detect when the lamp has been struck (i.e., confirm the light source is emitting UV radiation) by monitoring the voltage pulses across the UV lamp 12. Shutting down is desirable when pulses are not detected since no low impedance path exists for the power supply. The shut-down feature prevents waste of energy, harm to the control circuit, and provides an opportunity to attempt to strike the UV lamp 12 again or warn the user of a failure to operate correctly.

In yet another variation, one or more LEDs 20 or other indicators may be included in the circuit to provide visual feedback to the user during operation. In one preferred embodiment, a visual indicator LED 20 is illuminated at the completion of the sterilization cycle to indicate whether the cycle was successful. For example, if the UV lamp 12 and circuit 28 are operating correctly, the cycle proceeds for a pre-selected period of time that is sufficient to be germicidal for clear liquids in the amount contained. If necessary or desired, the container 34 can be agitated or if equipped with a cover to retain the water such as in FIG. 4 can be turned over such that all parts of the container 34 and liquid contained therein are treated by the UV light.

In another embodiment, LED 20 may be white, a single color, or be capable of displaying in multiple different colors for the purpose of conveying different information. For example, a green LED 20 may be illuminated upon successful completion of the sterilization cycle. Conversely, if the sterilization cycle failed to complete for some reason, a red LED 20 may be illuminated to alert the user that the water is not safe to drink. In a one-color embodiment, for example, the light may blink if the cycle is not successfully completed and come on steady for a period of time if the cycle is successful.

In yet another preferred variation, one or more electrically connected pins used as a liquid sensor 14 are provided for detecting the level of the water in the container 34. In another preferred configuration, sensor 14 is in contact with the water being sterilized only when the water level is high enough to completely immerse the UV lamp. The primary purpose of the sensor 14 is to help prevent unnecessary exposure to UV radiation. Liquid sensor 14 can be used to prevent operation of the float device 10 until it senses that it is immersed in water for a significant period of time, for instance a few seconds. Thus it provides a safeguard that is also relatively impervious to false activation by a stray raindrop or some mist or splash.

This provides an additional level of safety which helps prevent striking the tube when the UV lamp 12 is not completely immersed. More particularly, when the water level is insufficient, the container 34 does not provide contact with the pin(s). In another variation, one or more pins may provide a temperature sensor. In this embodiment, the micro-controller may adjust the period of the disinfection cycle according to water temperature.

The UV water purification device 10 provides an efficient and easy to use device for treating water. The device 10 has a rugged construction and is small and lightweight such that the system may be easily carried to a remote location, such as during hiking or camping. The device 10 may be manufactured at a low cost, thereby making the system affordable to persons living in impoverished areas that lack access to adequate water treatment facilities.

Preferred embodiments of the present invention provide an improved portable UV water purification 10 device. In one preferred embodiment, the device is small enough to be carried easily and floated in the container 34 of liquid being treated.

A further preferred embodiment includes a small, easily grasped handle 22 on top of the device to facilitate removal of device 10 from liquid. Thus the user will readily be able to pluck the device 10 out of the liquid being treated.

A further preferred embodiment includes one or more switches 16 to control starting or stopping the treatment cycle. This or these switches 16 could also enable or disable other optional features such as flashlight or length of treatment cycle.

A further preferred embodiment has the device being sealed on all sides against penetration of liquid. If the container 34 is large enough that some of the liquid to be treated is out of the effective reach of the UV light, and the container 34 has a lid or other method of enclosing the liquid, the container 34 can be inverted and otherwise moved such that more of the container 34 and enclosed liquid can be treated. This and other embodiments also allow the user to fill the container 34, such that it is not necessary to remove the device between treatments.

The water purification device 10 is preferably provided with a power source 26, such as batteries, and electronic circuitry for controlling the radiation of UV light. A case 32 may contain the power source 26 and electronic circuitry.

In one variation, a timing function, preferably implemented in a micro-controller, is operatively connected to the control circuit 28. The timing functionality may be implemented in software in the micro-controller. The micro-controller may then control the length of the treatment cycle by means of a timing function.

In another variation, the method further includes an indicator lamp 20, preferably a LED, to indicate to the user status of the device when in use. The LED 20 could indicate that the device 10 has been started; stopped; experienced an error, such as low batteries or premature termination of the treatment cycle; or other device or operation status.

In another variation, the method further comprises sensing that the liquid is above a predetermined level before applying power to the UV lamp 12, or removes power from the UV lamp 12 if liquid is not detected within a predetermined period of time. This feature prevents the system from operating when the container 34 is not sufficiently full of a liquid. Preferably a sensor 14 or metal contact extends into the interior volume such that the liquid can be detected by the control circuit or micro-controller if present.

In another variation, the method further comprises a cover 24 which is transparent to UV to protect the lamp. The UV transparent cover is made of quartz or other special UV transparent glass or plastic.

In another variation, the method further comprises a lantern or flashlight feature, where preferably a white LED is powered from the same source and provides a secondary function to the liquid treatment while being housed in the same case 32.

In another variation, the method further comprises a charging circuit or a circuit and otherwise necessary connections that allows an internal rechargeable battery to be recharged. Said connections could be fixed to the charge source with leads, and leads may be affixed to the charging source with magnets attached at the lead ends.

While the foregoing detailed description has described several embodiments of the apparatus and methods of the present invention, it is to be understood that the above description is illustrative only and not limiting of the disclosed invention. It will be appreciated that the specific components can differ from those described above, and that the methods described can be used with a wide variety of systems, while remaining within the scope of the present invention.

We claim:

1. A portable water purification device comprising:
   an ultraviolet light source;
   a float, connected to said ultraviolet light source, and having a float compartment sealed against water penetration; and
   a control circuit positioned within said float compartment, said control circuit being configured to control said ultraviolet light source,
   wherein said portable water purification device is configured to float in water, and
   wherein said ultraviolet light source is configured to be at least partly below said float when said portable water purification device is placed in water.

2. The device of claim 1 further comprising a liquid sensor connected to said control circuit.

3. The device of claim 1 further comprising a timer connected to said control circuit.

4. The device of claim 1 wherein said ultraviolet light source emits light primarily downward or horizontally or both.

5. The device of claim 1 further comprising a visible light source and a switch for controlling said visible light source.

6. The device of claim 1 wherein said ultraviolet light source is covered by an ultraviolet light transparent cover sealed against water penetration.

7. The device of claim 1 further comprising a battery, positioned within the float compartment; a switch for controlling said ultraviolet light source; and wherein said float and said ultraviolet light source are self-orienting such that the ultraviolet light source is maintained below water level when said float and said ultraviolet light source are placed in water.

8. The device of claim 7 wherein said battery is a rechargeable battery.

9. The device of claim 8 further comprising a charger circuit including connections to recharge said rechargeable battery.

10. A self-contained water purification system comprising:
a case containing an internal direct current power supply; and
an ultraviolet light source connected to said case and operatively connected to the internal direct current power supply,
wherein said case floats when placed in water,
wherein said ultraviolet light source is configured to be at least partly below said case when said self-contained water purification system is placed in water.

11. The system of claim 10 further comprising a liquid sensor; a control circuit connected to said liquid sensor; and said control circuit being connected to said ultraviolet light source.

12. The system of claim 10 further comprising a timer; a control circuit connected to said timer and to said ultraviolet light source.

13. The system of claim 10 wherein said ultraviolet light source emits light primarily downward or horizontally or both.

14. The system of claim 10 further comprising a visible light source and a switch for controlling said visible light source.

15. The system of claim 10 wherein said ultraviolet light source is covered by an ultraviolet light transparent cover sealed against water penetration.

16. A method of water purification comprising:
independently floating a bulbous case and an ultraviolet light source in water, the bulbous case being operatively connected to the ultraviolet light source and housing control circuitry, said control circuitry being operably connected to said ultraviolet light source and configured to control said ultraviolet light source;
initiating the emission of ultraviolet light from said ultraviolet light source, said initiation being performed by a user;
emitting ultraviolet light from said ultraviolet light source independently of further user interaction after said initiation of ultraviolet light emission by said user,
wherein said ultraviolet light source is configured to be at least partly below the surface of the water when floating in water.

17. The method of claim 16 further comprising measuring the time during which ultraviolet light is emitted and discontinuing said emission after a given time has passed.

18. The method of claim 17 further comprising cycling said ultraviolet light source off and on in a given pattern.

19. The method of claim 16 further comprising, detecting whether the ultraviolet light source is floating in water and either activating said ultraviolet light source floating or deactivating said ultraviolet light source when not floating.

20. The self-contained water purification system of claim 10, wherein the self-contained water purification system is configured to remain operable when immersed in liquid.

* * * * *